United States Patent Office 3,753,901
Patented Aug. 21, 1973

3,753,901
FLOCCULATION OF AQUEOUS INDUSTRIAL WASTES USING POLYQUATERNARY AMMONIUM CHLORIDE POLYMERS
Charles M. Taubman, Flossmoor, and Annette M. Carabine, Niles, Ill., assignors to DeSoto Inc., Des Plaines, Ill.
No Drawing. Filed Sept. 4, 1970, Ser. No. 69,920
Int. Cl. C02b 1/20
U.S. Cl. 210—49
12 Claims

ABSTRACT OF THE DISCLOSURE

Aqueous wastes, and particularly aqueous latex paint wastes, are flocculated using a polymer of benzyl $C_1$–$C_4$ dialkyl acryloyl- or methacryloyl-oxyalkyl ammonium chloride. Preferred polymers are produced by aqueous solution polymerization at a temperature below about 90° C. and a proportion of acrylamide or methacrylamide is desirably present in the polymer.

---

The present invention relates to the flocculation of aqueous industrial wastes, and particularly to the flocculation of aqueous emulsion paint wastes which are especially difficult to handle because they include dispersed pigments as well as non-ionic and anionic surfactant-dispersed resin particles and because these wastes possess a high chemical oxygen demand and resist biological oxidation.

Numerous compounds useful for flocculating aqueous industrial wastes are known, but these have limited effectiveness and are largely ineffective when used for the flocculation of aqueous emulsion paint wastes. As a result, the disposal of such paint wastes has contributed significantly to the national pollution burden.

In the present invention a polyquaternary chloride polymer is employed which is an aqueous solution addition polymer of benzyl dialkyl (preferably dimethyl) acryloyl- or methacryloyl-oxyalkyl ammonium chloride. The polymer may be a homopolymer, but it is preferred to employ a copolymer in which the quaternary vinyl monomer is copolymerized with other copolymerizable monoethylenic compounds such as acrylamide, methacrylamide, methyl acrylate, vinyl acetate, and the like. Many industrial waste waters can be treated with these polymers to yield a clear supernatant layer which is substantially free from suspended matter, and a compact mobile sludge layer. In particular, the waste water derived from the manufacture of latex paint when treated with these polymers at very low levels yields a clear supernatant layer and a mobile sludge layer.

The latex waste water is derived from the cleaning processes used in the production of latex paint, as when the equipment used is washed down at the end of a production run. This waste is characterized by very high levels of colloidal and suspended particles which cannot be discharged directly to sewer lines. Many commercial polyelectrolytes specifically recommended for flocculation of aqueous industrial wastes are either not effective at all, or are effective only at high dosage levels in separating the suspended solids from latex waste water in the form of a mobile sludge.

The copolymers used in this invention are approximately as efficient for flocculation as the homoplymers, but have the advantage of an extended optimum dosage range. The dosage range is the extent to which excess flocculant over that needed for complete flocculation can be tolerated before a tendency for redispersion is encountered. Thus, the copolymers are preferred, especially copolymers with acrylamide or methacrylamide, because these copolymers are less affected by dosage error.

Numerous factors are critical in the invention. Thus, the corresponding quaternary ammonium sulfate is not comparable to the chloride. Indeed, and comparing 50/50 copolymers with acrylamide, it was found that the quaternary ammonium sulfate copolymers were less efficient and possessed a narrower optimum dosage range, and, of considerable importance, the floc which did form was fragile and broke down easily on continued agitation, as compared with results obtained with the corresponding quaternary ammonium copolymers.

Referring more particularly to the polymers which are used in accordance with this invention, the primary component thereof is a compound having the formula:

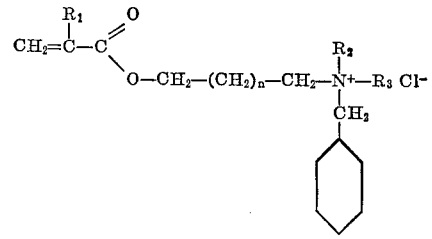

in which $n=0$–$2$ (preferably 0); $R_1$ is hydrogen or methyl; and $R_2$ and $R_3$ are $C_1$–$C_4$ alkyl, preferably methyl.

The monoethylenic monomers which may be copolymerized with the quaternary vinyl monomers are subject to considerable variation so long as solubility of the copolymer in the aqueous polymerization medium is not prevented. Monomers which do not interfere with water solubility such as acrylamide or methacrylamide are particularly preferred. While homopolymers are useful, it is preferred to include in the copolymer from 10–75% by weight of copolymerizable monoethylenic monomer, preferably from 25–60% by weight, based on the weight of the copolymer. An acrylamide is the preferred copolymerizable monomer since it is water soluble and, also, improves product performance.

It is not necessary that the comonomer provide water soluble polymers by itself. Thus, methyl acrylate and vinyl acetate may be utilized so long as the proportion is not so high as to destroy solubility in the aqueous medium which is used for polymerization. It is possible to enhance the solubility of the polymer in the aqueous medium by including therein a minor proportion of water miscible organic solvent. These are illustrated by methanol, ethanol, propanol or 2-ethoxy ethanol, or a ketone such as acetone or methyl ethyl ketone, and the like.

The polymers and copolymers which are used in the invention are formed by addition copolymerization which is normally carried out in solution medium in order to produce addition polymers of uniform character and appropriate molecular weight. Molecular weight is conveniently determined by the viscosity of a water solution containing 18.0% non-volatile resin. In this invention, the polymer should have a viscosity determined by a Brookfield Viscometer using a #6 Spindle at 20 r.p.m. of from 300–50,000 centipoises, preferably from 12,000–35,000 centipoises. Below 300 centipoises, the flocculating effectiveness is substantially reduced. Above 50,000 centipoises, the handling problems increase significantly with no detectable increase in effectiveness.

The polymer which is used must be dispersible in water or water containing a water-miscible organic solvent so that the polymer will remain dispersed in the aqueous phase. Thus, if the polymerization reaction is carried out in an organic solvent solution, then the solvent would normally be selected for water miscibility so that the resulting polymer solution could be directly dispersed in water.

As a feature of the invention, the polymers and copolymers of this invention are preferably produced by carrying out the addition polymerization reaction in an aqueous medium. As is customary, the addition polymerization reaction requires the presence of free radical generating polymerization catalyst illustrated by potassium persulfate or benzoyl peroxide. However, in the present development, the temperature of reaction in the aqueous medium should be maintained below about 90° C.

The polymerization reaction involving the quaternary vinyl monomer is a vigorous one and care must be taken to avoid explosion. This is easily accomplished by starting the reaction in a dilute aqueous medium and adding the remainder of the monomers and the free radical generating catalyst incrementally. Also, redox acceleration of the system, which may occur if a reducing agent is present, should be avoided since this also speeds the reaction and increases the danger of explosion. Moderate heat is desirably used to start the polymerization, but the mixture is desirably cooled thereafter since there is an exotherm and cooling is normally needed to prevent the reaction temperature from increasing unduly.

While the polymerization or copolymerization reaction is preferably carried out in aqueous medium with the quaternary vinyl monomer in solution to produce a polymer product which remains in solution, it is important that hydrolysis in the aqueous medium be avoided. Avoidance of hydrolysis is not difficult since the rate of hydrolysis is not significant as long as the reaction temperature is maintained below about 90° C. and materials which catalyze hydrolysis, such as iron or bases, are avoided.

The polyquaternary chloride polymers of the invention are utilized herein by adding them to the aqueous waste under consideration in an amount of 0.2–4% by weight of polymer, based on the weight of the solids to be flocculated. Preferred proportions on the same basis are 0.4–1.5%. These proportions accommodate variation in the concentration of suspended solids, but in any given system it is convenient to report the dosage used in milligrams of polymer per liter of waste being treated. It is a feature of the invention that the concentration of added polyquaternary chloride polymer is far less critical herein than is the case for other flocculants which are potentially useful. The mixture is then agitated to assist the flocculation process, as is known. While agitation of the aqueous waste-flocculating agent mixture is conventional, the conditions and duration of agitation are less critical in this invention than is the case with other flocculating agents where continued agitation tends to break down the floc and cause at least partial redispersion thereof.

It is desired to further point out that soluble materials are sometimes present in aqueous latex paint wastes to serve as a fungicide or preservative, these being illustrated by phenyl mercuric acetate. The desirability of removing these dissolved materials is self-evident, but it is equally evident that they cannot be removed until the suspended solids are eliminated from the system. In this connection, it is noted that the untreated aqueous latex waste is quite resistant to biological oxidation, and it is possible that mercuric salts contribute to this resistance. This resistance to biological oxidation does not extend to the clarified effluent which is produced herein, leading one to believe that the flocculation treatment of this invention has somehow removed the mercuric salts. To corroborate this, a specimen of waste water containing 2% of unflocculated latex solids was found to contain 8.8 parts per million of mercury. After treatment with 75 milligrams per liter of the copolymer of Example 1 presented hereinafter, the mercury content of the clarified effluent was below 1 part per million, the lowest amount detectable by the test instrument used. In some instances, acidic clays, such as Wyoming Bentonite Clay, are helpful to the removal of mercury by the flocculating action.

After the aqueous waste has been flocculated as described hereinbefore, agitation is preferably reduced to a minimum and the suspension ultimately is permitted to stand whereupon the floc settles to the bottom to form a sludge and a supernatant clarified effluent. The clarified effluent is then discharged to sewer or to a water reuse tank, or subjected to further treatment to remove any remaining contaminants. Desirably, the bulk of the clarified effluent is reused as wash water to minimize the volume of effluent which is discharged to either a municipal or industrial waste treatment facility. However, it will be understood that the effluent is now biologically degradable, that it contains very little suspended material, and that the resinous components are largely eliminated so that the tendency of these materials to induce sewer line plugging is avoided.

The sludge is pumped away and is then concentrated in conventional fashion by gravity settling or in other conventional manner. Finally, the sludge is disposed of in a sanitary land fill where the remaining water present evaporates to convert the sludge to a cake having the general consistency of clay.

Various auxiliary treating agents are also permissible in accordance with the invention. Thus, in addition to the polyquaternary chloride polymers and copolymers which have been disclosed hereinbefore, the treatment of the aqueous waste can include the addition of nucleating clays such as alkali metal bentonite clays or an anionic polyelectrolyte such as ammonium or alkali metal salts of diverse acidic polymers such as partially hydrolysed acrylamide polymers, acrylic or methacrylic acid-containing copolymers, and styrene-maleic copolymers. These materials are represented in the market place by Dow's AP–30, AU–21, Calgon's 253, and Dearborn's Aquafloc 415. The bentonite clays are illustrated in the market place by American Colloid's Volclay KWK, Volclay SPV; Ashland Chemical's Green Bond, Wyobond; Wyo Ben Products, Wyoming Bentonite Clay; Georgia Kaloins K–2 and K–4 and National Lead's Bariod Division Coaguloid.

The invention is illustrated in the examples which follow.

EXAMPLE 1

Preparation of a preferred acrylamide-containing copolymer

To a four necked round bottom flask equipped with a stirrer, nitrogen sparge, thermoregulator for heating or cooling, monomer inlet and condenser, are charged 700 parts of deionized water and heat is applied to bring the water to 70° C. In a separate flask 250 parts of acrylamide and 385 parts of a 65% aqueous solution of benzyl dimethyl methacryloyloxyethyl ammonium chloride are dissolved in 365 parts of deionized water to form a monomer premix. A portion of the monomer premix (20%) is added to 70° C. water together with 25.4 parts of free radical generating catalyst formed by dissolving 1.6 parts of potassium persulfate in 100 parts of deionized water. The remainder of the monomer premix and the balance of the catalyst solution is added in increments over a period of about an hour while maintaining 70° C. During the monomer addition an exotherm occurs requiring cooling. The peak temperature in this example was 88° C. before air cooling stopped the temperature rise and cooled the mixture back to 70° C. Then, 0.5 part of potassium persulfate in 100 parts of water are added and 70° C. is maintained for one hour whereupon the solution product is cooled and discharged ready for use. It has a non-volatile content of 27%.

EXAMPLE 2

Treatment of aqueous latex paint waste

A typical aqueous latex paint waste is characterized by a substantial concentration of suspended solids (10,000 or more—milligrams per liter); a substantial chemical oxygen demand (15,000 or more—milligrams per liter); and a substantial total solid concentration (15,000 or more—milligrams per liter). If this suspension is placed in the quiescent state, a very small reduction in pollutional constituents is obtained. This reduction is very small compared to the reduction required for discharge of the waste to surface water or to a municipal sewer system.

The suspended solids of this waste are, in general, non-biodegradable pigments and resinous latex solids which represent a high inert solids loading problem to a municipal waste treatment plant as well as a serious sanitary sewer plugging problem.

Adding to the municipal waste treatment problem is the high level of surfactants present in the waste. These surfactants present problems to a treatment plant which utilizes the activated sludge process (the most common installation). Poor oxygen transfer and non-settling sludges are the main difficulties associated with surfactant-containing aqueous latex paint wastes. The surfactants also produce unsightly foaming.

An aqueous latex paint waste of the type described above (see Table I for further details) is treated by mixing the same with a small proportion of the aqueous polymer-containing solution prepared in Example 1 to provide a concentration of 150 milligrams per liter of the polyquaternary chloride polymer contained in the said solution. The mixture of polyquaternary polymer and aqueous latex paint waste is deposited in a flocculating unit where it is gently agitated until the suspension and emulsion are broken up and a settlable floc is produced. Flocculation is generally complete after 3 minutes of agitation with the agitator rotating at 100 r.p.m., followed by 3 minutes of agitation at 50 r.p.m. Desirably, agitation is stopped when flocculation is complete and the floc is allowed to settle, but continued agitation is not critical to the present invention since continued stirring at 50 r.p.m. for a total of 30 minutes instead of 3 minutes is not detrimental.

After settling is complete, it is found that more than 95% of the solids and more than 50% of the chemical oxygen demand have been eliminated from the supernatant liquid. The sludge is pumpable and can be removed in this manner for conventional concentration and disposal in a land fill. The clarified effluent can be used as wash water to minimize the volume of clarified effluent which must be disposed of.

The improvements obtained in accordance with the present invention will be more fully appreciated by comparing simple gravity settlement as reported in Table I with typical results obtained by the invention.

TABLE 1

Listed below are the results obtained from averaging 15 typical batches of latex waste water at a latex paint industrial plant.

| | Well mixed | Gravity settled without treatment for 30 minutes | Percent reduction |
|---|---|---|---|
| Chemical oxygen demand (milligrams/liter) | 26,000 | 21,300 | 18 |
| Total solids (milligrams/liter) | 30,500 | 22,000 | 27 |
| Total suspended solids (milligrams/liter) | 23,000 | 17,000 | 26 |
| pH | 7.2 | | |
| Color | Opaque and variable | | |

To further illustrate the improvement achieved in the invention, there is presented a Table II which shows the results obtained utilizing the product of Example 1 in comparison with a conventional commercial cationic flocculant which is recommended in the market place for the treatment of latex waste water and which represents in our experience the best commercially available flocculant for this purpose.

Referring more particularly to Table II, it will be seen that the latex waste treated contained a high proportion of suspended solids than the latex waste water treated in Table I. It will further be observed that the Example 1 product was used to provide a dosage of 600 milligrams of polymer per liter of waste water being treated, this dosage representing an optimum dosage for producing a fast settling thick floc for the particular waste being treated. At the same dosage, the commercial cationic polymer exhibited almost no flocculating activity. Accordingly, Table II reports the results of using 900 milligrams of the commercial polymer per liter of waste water which was the dosage at which the commercial polymer exhibited its greatest fluocculating activity.

TABLE II.—TREATMENT OF LATEX WASTE WATER

| Treatment | Dosage (mg./l.) | Chemical oxygen demand (mg./l.) | Total solids (mg./l.) | Total suspended solids (mg./l.) | Percent reduction | | | Proportion of waste forming clarified effluent after 30 minutes settling, percent |
|---|---|---|---|---|---|---|---|---|
| | | | | | Chemical oxygen demand | Total solids | Total suspended solids | |
| Raw | | 52,000 | 72,900 | 45,550 | | | | |
| Example 1 solution | 600 | 5,580 | 2,440 | 54 | 89 | 96.7 | 99.9 | 90 |
| Commercial cationic polymer | 900 | 12,500 | 9,180 | 916 | 76 | 87 | 97.9 | 10 |

The very considerable improvement in accordance with the invention is self-evident from the data set forth above.

The invention is defined in the claims which follow.

We claim:

1. A method for the flocculation of an aqueous latex paint waste containing dispersed pigment, emulsified resin particles and surface active agents comprising agitating said aqueous waste in the presence of 0.2–4% by weight of a polyquaternary polymer, based on the weight of solids to be flocculated, the primary component of said polyquaternary polymer being a vinyl compound having the formula:

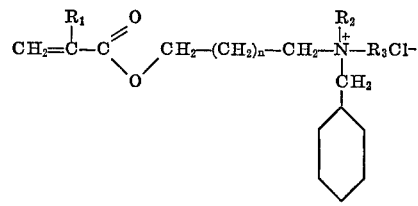

in which $n=0-2$; $R_1$ is hydrogen or methyl; and $R_2$ and $R_3$ are $C_1-C_4$ alkyl, said polymer being dispersible in water or water containing water-miscible organic solvent, and an 18.0% solids content water solution thereof having a viscosity determined by a Brookfield Viscometer using #6 spindle at 20 rpm of from 300–50,000 centipoises.

2. A method as recited in claim 1 in which said polymer is produced by addition polymerization in aqueous solution containing free-radical generating catalyst at a temperature below about 90° C.

3. A method as recited in claim 1 in which $n=0$ and $R_2$ and $R_3$ are methyl.

4. A method as recited in claim 1 in which said polymer is a copolymer containing said vinyl compound together with monoethylenic monomer copolymerizable therewith.

5. A method as recited in claim 4 in which said monoethylenic monomer is an acrylamide.

6. A method as recited in claim 4 in which said monoethylenic monomer is present in an amount of from 10–75% by weight.

7. A method as recited in claim 5 in which said acrylamide is present in an amount of from 25-60% by weight.

8. A method as recited in claim 1 in which said aqueous solution includes water-miscible organic solvent.

9. A method as recited in claim 1 in which said polymer contains polymerized benzyl dimethyl methacryloyloxyethyl ammonium chloride and the viscosity of the polymer as defined hereinbefore is from 12,000 to 35,000 centipoises.

10. A method as recited in claim 1 in which said polymer is a copolymer of benzyl dimethyl acryloyl- or methacryloyl-oxyethyl ammonium chloride and from 10-75 parts of acrylamide or methacrylamide and the polymer is employed in an amount of 0.4-1.5%, based on the weight of solids to be flocculated.

11. A method as recited in claim 1 in which an alkali metal bentonite clay is also present.

12. A method as recited in claim 1 in which an ammonium or alkali metal salt of an acidic polymer is also present.

References Cited

UNITED STATES PATENTS

| | | | |
|---|---|---|---|
| 2,810,713 | 10/1957 | Melamed | 260—86.1 N |
| 3,300,406 | 1/1967 | Pollio | 210—52 |
| 2,995,512 | 8/1961 | Weidner et al. | 210—54 |
| 2,435,777 | 2/1948 | Glavis et al. | 260—86.1 N |
| 3,385,839 | 5/1968 | Honig et al. | 260—86.1 N |
| 3,259,570 | 7/1966 | Priesing et al. | 210—54 X |

FOREIGN PATENTS

| | | | |
|---|---|---|---|
| 218,615 | 5/1957 | Australia | 210—54 |
| 216,301 | 9/1956 | Australia | 210—54 |

SAMIH N. ZAHARNA, Primary Examiner

T. G. WYSE, Assistant Examiner

U.S. Cl. X.R.

210—52, 54